United States Patent [19] [11] Patent Number: 5,816,822
Safavi [45] Date of Patent: Oct. 6, 1998

[54] METHODS AND APPARATUS FOR INSTRUCTING STUDENTS OF STATISTICS

[76] Inventor: Farrokh Safavi, Western Washington University, Bellingham, Wash. 98225-9077

[21] Appl. No.: 893,651

[22] Filed: Jul. 11, 1997

[51] Int. Cl.$^6$ .................................................. G09B 23/02
[52] U.S. Cl. ....................................... 434/188; 273/144 R
[58] Field of Search ................................... 434/196, 195, 434/188; 273/120 R, 138.3, 144 R

[56] References Cited

U.S. PATENT DOCUMENTS

| | | | |
|---|---|---|---|
| 2,789,371 | 4/1957 | Shanhouse | 35/30 |
| 3,406,900 | 10/1968 | Hunt | 235/70 |
| 3,579,860 | 5/1971 | Strem | 35/31 |
| 4,842,521 | 6/1989 | Johansen | 434/187 |
| 4,900,255 | 2/1990 | Laghi | 434/188 |
| 5,366,378 | 11/1994 | Johannsen et al. | 434/187 |

Primary Examiner—Paul J. Hirsch
Attorney, Agent, or Firm—Michael R. Schacht; Hughes & Schacht, P.S.

[57] ABSTRACT

An instructional system or method for statistics students. Twenty slots are defined into which one hundred data cubes are placed. The number of cubes per slot varies from one to ten, excluding six. The slots with ten cubes are arranged adjacent to a center line, and the number of cubes per slot drops as the distance between a slot and the center line increases. The cubes model a normal distribution curve and can be used to estimate probabilities and other statistics concepts. The system associates statistics computational methods with the fundamental concepts of statistics in a manner that enhances the students understanding of statistics as a whole. The system also enables students with low aptitude for math and quantitative methods to grasp the concepts of statistics and pass the college tests for entering those disciplines which require a standard knowledge of statistics for admission.

20 Claims, 4 Drawing Sheets

FIG. 1A

METHODS AND APPARATUS FOR INSTRUCTING STUDENTS OF STATISTICS

TECHNICAL FIELD

The present invention relates to the instructional tools and methods and, more specifically, to methods and apparatus for instructing students of statistics in a manner that clearly relates statistical concepts to the computation of statistical probabilities.

BACKGROUND OF THE INVENTION

In many fields of study, such as business, biology, engineering, science, and the like, statistics principles are used as tools to help analyze underlying data. Many colleges thus require that students take a course in statistics as a prerequisite to entry in degree programs requiring an understanding of the principles of statistics.

The study of statistics has often been characterized as difficult, and statistics courses sometimes have the effect of filtering out students from certain fields of study. This is unfortunate because many capable students do not obtain degrees in certain fields of study because of required statistics courses. These students may have all of the skills required to be good businesspersons, doctors, engineers, or scientists, but do not pursue such careers because the study of statistics provides a real or perceived barrier to obtaining a required degree.

The characterization of statistics as being difficult arises primarily because of the way statistics has been taught at the college level. Traditional statistics curricula have emphasized the mathematical foundation of statistics. The mathematical foundation of statistics involves the use of complex formulas to calculate values from which the statistician can draw inferences about a given population of data. These formulas are difficult to solve and are often presented in tables that allow the student or statistician to estimate values based on certain known variables; these tables offer only approximations and are notoriously difficult to use. An understanding of the mathematical foundation of statistics is essential to a complete understanding of statistics at the conceptual level, but because of the emphasis on mathematics, statistics courses can be an insurmountable barrier to some students.

Computing devices such as computers or calculators are often used to ease the calculations involved in statistics. Computing devices are highly accurate tools but can so distance the beginning student from the mathematics involved that the student can draw meaningful conclusions from raw data only with the assistance of the computing device. The student relying on computers thus may be lacking in the basic mathematical skill necessary for a complete understanding of statistics concepts and does not have adequate foundation to interpret data when a computing device is not available.

The need thus exists for instructional methods and systems that relate statistics concepts to the mathematics underlying statistics in a manner that allows the student to more easily: (a) understand the relation between the fundamental concepts of statistics and statistical mathematics; and (b) arrive at numerical estimations of statistics variables based on known data without the use of computers or calculators.

OBJECTS OF THE INVENTION

From the foregoing, it should be apparent that one primary goal of the present invention is to provide improved methods and systems for instructing students of statistics.

Another more specific goal of the present invention is to provide instructional systems and methods that have a favorable mix of the following characteristics:

a. can be easily and inexpensively implemented as a mechanical device or in software;

b. clearly illustrates the link between conceptual and mathematical aspects of statistics;

c. provides sufficient insight into the computational side of statistics to students without strong math backgrounds to allow such students to pass statistics courses; and d. enables students to perform statistical calculations in their head, thereby actively participating in oral presentation and analysis of statistical problems.

PRIOR ART

The following references were uncovered as part of a professional patentability search performed on behalf of the Applicant.

U.S. Pat. No. 4,900,255 to Laghi discloses a device for illustrating a statistics principle that may be stated as "The Sum Of Normal Independent Sets Of Events Is Normal". This device comprises a plurality of balls which are dropped from a hopper through a set of pins into a series of slots. As the balls drop through the pins, they are scattered such that they fill the slots in a manner that forms a histogram representing the shape of a normal or "bell-shaped" device then allows the balls in this first set of slots to drop through a second set of pins into a second set of slots. The balls are randomly scattered again through the second set of pins and fall into the slots into a second histogram that will also have the shape of a normal curve. This device does not allow the estimation of probabilities from control data population.

The devices shown in U.S. Pat. Nos. 5,366,378 to Johannsen et al., 4,842,521 to Johannsen, 3,579,860 to Strem, 3,406,900 to Hunt, and 2,789,371 to Shanhouse all disclose visual aids for educational purposes, but none relate specifically to the study of statistics and none have the specific properties of the present invention. The two Johannsen patents employ sliding indicators mounted on a rail, but these are not detachably attached to a transmission system that allows them to be moved independently when detached and moved together in opposite directions when attached.

It is respectfully submitted that none of the foregoing patents, either alone or in combination, disclose, teach, or suggest the principles of the present invention.

SUMMARY OF THE INVENTION

The present invention is a system or method for estimating probabilities that defines twenty columns or slots symmetrically arranged about a center line. Each of the slots is configured to contain a predetermined number of tokens or cubes each representing a percentage of a statistical population. Each of the slots or rows further corresponds to a percentage of standard deviation, and the probability of a given event occurring can be estimated by determining the number of blocks within a range of rows or columns. In effect, the system or method of the present invention allows the user to visualize the area under a normal distribution curve.

In one preferred form, the invention is a system comprising a frame defining the twenty slots described above. Ten of the slots are arranged on one side of a center line, and ten of the slots are arranged on the other side of the center line.

Starting from the center line and moving outward in both directions, the slots are designed to hold 10, 9, 8, 7, 5, 4 3, 2, 1, and 1 cubes, respectively. These cubes are three-dimensional pieces of about the size of small game dice. In this embodiment, each cube represents 1% of the statistical population under analysis, and a total of 100 cubes is provided (fifty on each side of the center line). By counting the number of cubes in a given slot or range of slots, an approximation of statistical probabilities can be obtained. This system thus visually and even tactilely relates the computation of statistical probabilities to the raw data related to the statistical population under study.

The system further provides a ruler containing indicia of the center and scales relevant to the population under study. This ruler will also contain a visual indication of the percentage of standard deviation; in this case, the center line will represent zero and each slot will be labeled in 0.25 increments extending in each direction from the center line. In practice, slots to the right are assigned values from 0.25 to 2.5, while slots to the left are assigned values from –0.25 to –2.5.

The system allows the user to understand the scale of normal distribution (commonly referred to as the z scale) which ranges from –3 z to +3 z, by extending the indicia on an upper portion of the ruler to –3.00 z and +3.00 z. No slots are provided to represent those higher z values on the exemplary frame designed to use one hundred cubes. This is because a normal population that consists of one hundred elements (corresponding to the one hundred cubes) is not likely to have a value that can be associated with less than –2.5 z or greater than 2.5 z. However, if a normal population is comprised more elements, such as one thousand or more, then a few elements may fall in slots corresponding to less than –2.5 z or greater than 2.5 z.

Imprinted on the cubes is a graphical representation of the data represented thereby. Usually, this representation will take the form of a number between the lowest and highest value of the population element within the range of the population under study. The population selected for study will normally be an example that clearly illustrates the principles of the normal distribution curve.

With the foregoing system, one can estimate the area under the normal distribution curve and thus estimate the probability of a given population element occurring under that segment of the curve. Additionally, after working with the system described above, it is fairly straightforward to memorize the algorithm underlying the system and method of the present invention. This algorithm can subsequently be used on the spot to estimate probabilities when one does not have access to tables or computers for calculating these values.

Additionally, this system provides a hands-on approach that provides tactical feedback to the user. Many students respond and learn much more readily in circumstances where such manipulation of physical objects is employed.

In another form, the invention can be embodied as a method that may be implemented using software on a general purpose computer or calculator. In particular, this method comprises the steps of defining twenty columns centered about a given location, assigning a percentage of standard deviation to each of the columns, placing tokens in the columns, where each token represents both 1% of the statistical population and a given statistical element within that population, and estimating the probability of a statistical element occurring within a given range of standard deviation by counting the number of tokens in the columns within the range of standard deviation.

This method can further comprise the steps of labeling the leftmost and rightmost columns with the lowest and highest value of the population elements within the range and labeling the remaining columns with a scale determined by the lowest and highest values in the range.

In a slightly more abstract form, the present invention comprises the steps of determining the highest and lowest values of the population element within the range, dividing the range into twenty equal segments including the lowest and highest value, dividing each of 5 standard deviations by 4 to obtain 20 standard deviation increments, associating each of the standard deviation increments with one of the population element increments, associating 10% of the population elements with the 10th and 11th columns, associating 9 elements of the population with the 9th and 12th column, associating 8% of the population with each of the 8th and 13th columns, assigning 7% of the population to each of the 7th and 14th columns, assigning 5% of the population to each of the 6th and 15th columns, assigning 4% of the population to each of the 5th and 16th columns, assigning 3% of the population to each of the 4th and 17th columns, assigning 2% of the population to each of the 3rd and 18th columns, assigning 1% of the population to each of the 1st, 2nd, 19th and 20th columns. The probability that a given population element will occur in a given range of population elements can be approximated by determining the number of tokens within that range.

From the foregoing, it can be seen that the present invention can be embodied as a teaching aid that allows students to make the connection between conceptual and computational aspects of statistics, retain this understanding over time, and be able to use this understanding to estimate probabilities without use of tables or a computer.

BRIEF DESCRIPTION OF THE DRAWINGS

FIG. 1 is a front elevational view of a first mode of an educational device constructed in accordance with, and embodying, the principles of the present invention;

FIG. 2 is a front elevational view of another embodiment of an educational device constructed in accordance with, and embodying, the principles of the present invention.

DETAILED DESCRIPTION

Figure 1A:
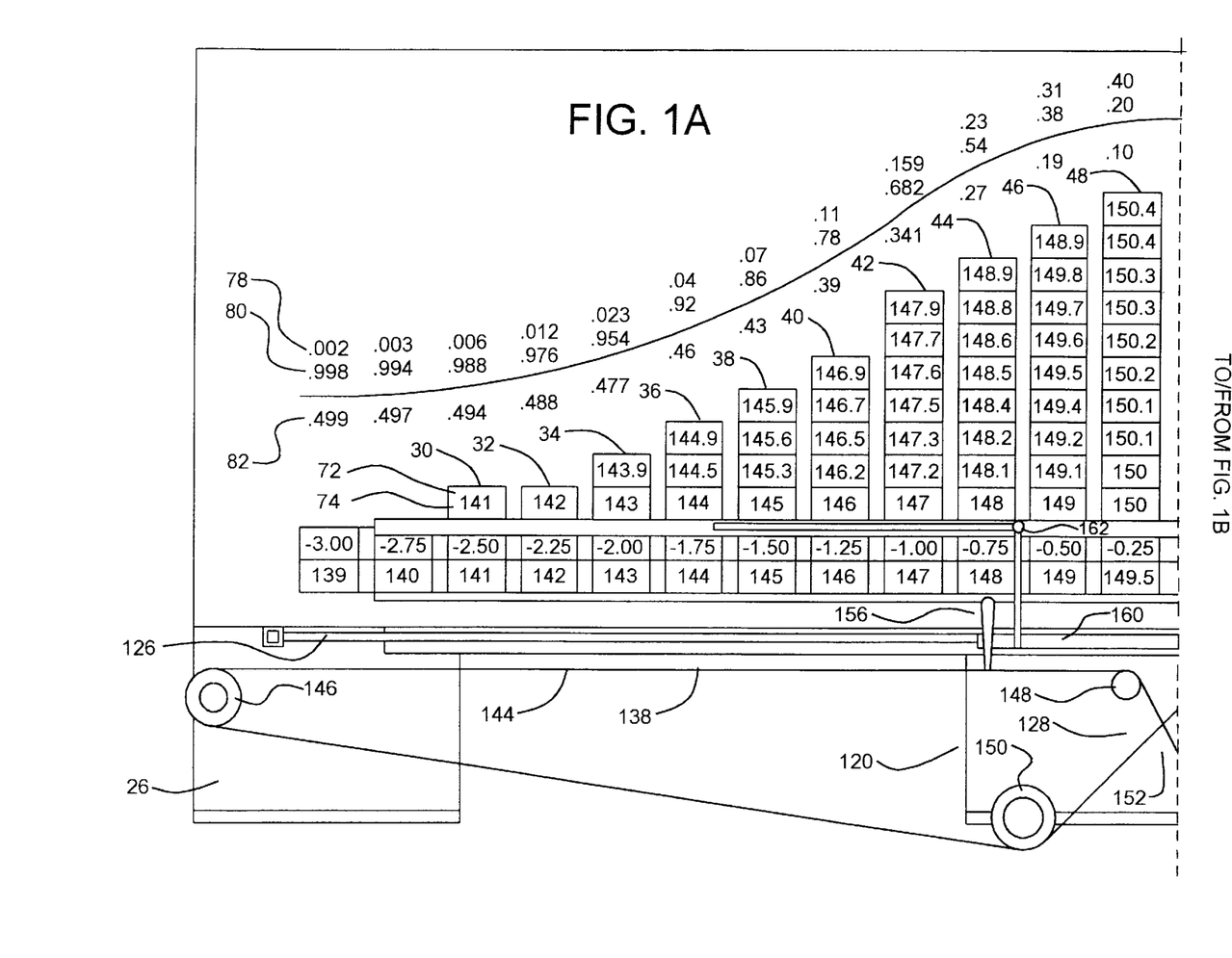
Figure 1B:
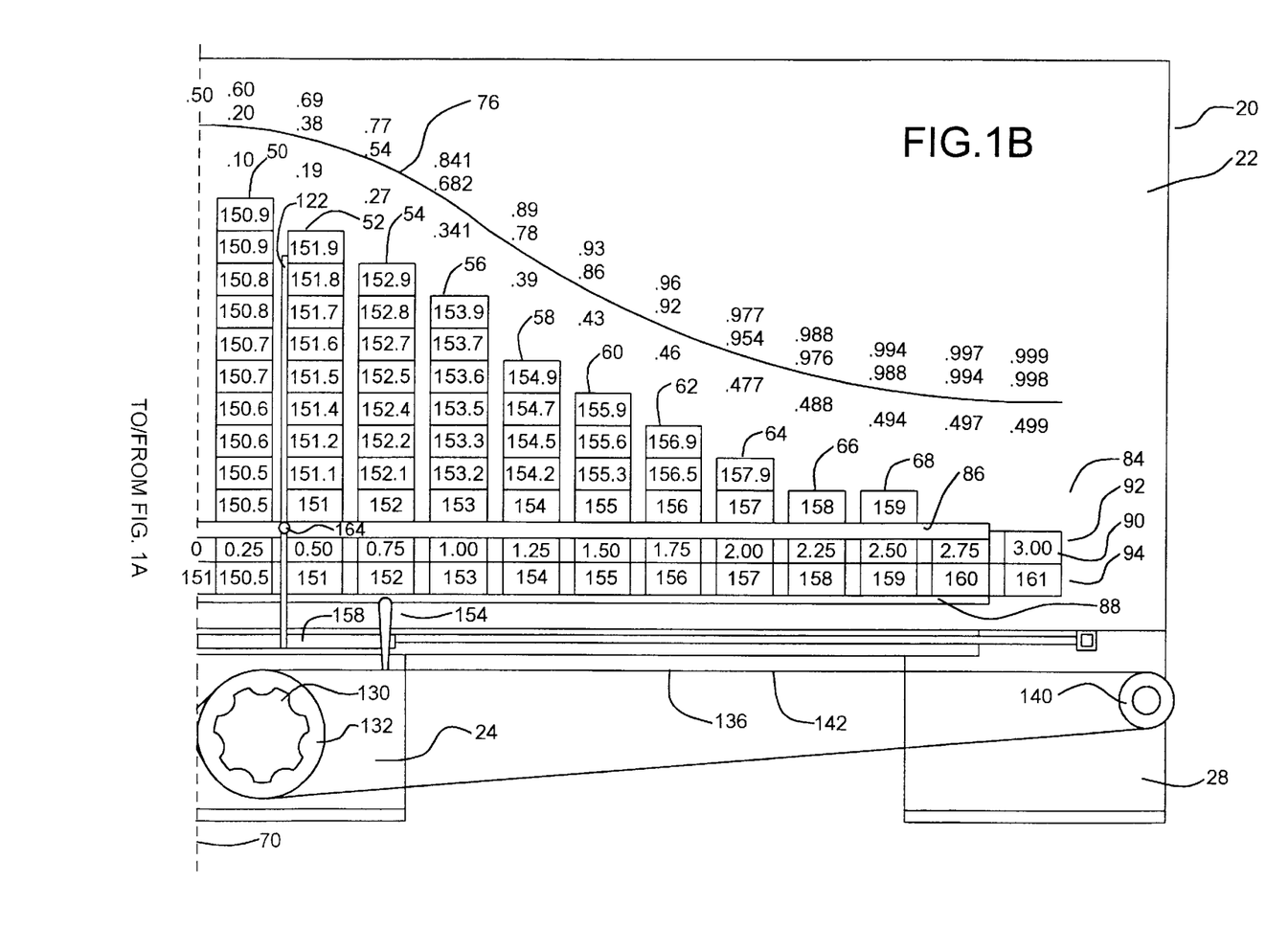

Referring now to the drawing, depicted therein at 20 is an educational device constructed in accordance with, and embodying, the principles of the present invention. This device 20 comprises a frame 22 to which legs 24, 26, and 28 are attached, The legs 24–28 hold the frame 22 in an upright position.

Formed in the frame 22 are a series of 20 grooves identified by reference characters 30–68. Each of these grooves 30–68 are symmetrically arranged around a center line indicated by reference character 70. These grooves 30–68 all have the same horizontal dimension, but have one of nine vertical dimensions.

Arranged within the grooves 30–68 are one or more cubes 72. The grooves 30–68 are designed to contain a total of 100 of these cubes 72. Each of the cubes 72 represents a 1% probability that a statistical element will occur.

These cubes 72 further comprise a graphical element or indicia 74 that indicates the data, or discrete population element, with which the block 72 is associated. The indicia 74 thus represent real world data to be analyzed by the system 20.

It can be seen that the grooves 48 and 50 can hold ten blocks each, the grooves 46 and 52 hold nine blocks each, the grooves 44 and 54 hold eight blocks each, the grooves 42 and 56 hold seven blocks each, the grooves 40 and 58 hold five blocks each, the grooves 38 and 60 hold four blocks each, the grooves 36 and 62 hold three blocks each, the grooves 34 and 64 hold two blocks each, and the grooves 30, 32, 66, and 68 hold one block each. One versed in statistics will recognize from FIG. 1 and the foregoing explanation that the general configuration of grooves 30–68 (in height) and cubes 72 (in number) represents a normal distribution curve (often referred to as a bell-shaped curve). To illustrate the relationship between the grooves 30–68 and cubes 72, a normal distribution curve 76 is imprinted on the frame 22 above the upper ends of the grooves 30–68.

Arranged adjacent to the curve 76 are first, second, and third groups of numbers 78, 80, and 82. The number group 78 contains numbers that generally correspond to the cumulative percentage of population elements under the curve 76 from left to right in FIG. 1. The second number group 80 contains numbers that indicate the percentage of population elements under the curve starting from the center line 70 and moving in both directions. The third number group 82 contains numbers that indicate, for each column 30–68, the percentage of standard deviation cumulative from the center line 70 and moving in each direction therefrom. The center line 76 and its associated number group 78–82 thus provide a convenient reference point for persons using the system 20.

The instructional system 20 further comprises a ruler system 84 comprising rails 86 and 88 and a ruler 90 that is inserted between and held by the rails 86 and 88. The ruler 90 comprises an upper portion 92 on which are marked six standard deviations and a lower portion 94 on which is marked the scale and increments of the real world data being modeled by the system 20.

The system 20 further comprises a bracketing system 120. The bracketing system 120 comprises brackets 122 and 124 arranged to move along a rod 126 attached to the frame 22. The bracket system 120 further comprises a transmission system 128. The transmission system 128 is designed to allow the brackets 122 and 124 to be moved in opposite directions relative to the center line 70 simply by turning a knob 130. In particular, the knob 130 is attached to a drum 132. Formed on the drum 132 are first and second grooves (not shown) arranged to receive first and second belts 136 and 138. The belt 136 is held taught between the drum 132 and a roller bearing 140 such that a portion of the belt 136 extends along the length of and is parallel to the rod 126. Rotation of the knob 130 and thus the drum 132 causes the belt 136 to move such that the upper portion 142 thereof moves left and right parallel to the rail 126.

The belt 138 is configured such that an upper portion 144 thereof similarly moves left and right parallel to the rod 126. However, the belt 138 not only goes around the drum 132 and a roller bearing 146, but also goes around roller bearings 148 and 150. The roller bearings 148 and 150 cause the belt 138 to cross as shown at 152 such that rotation of the knob 130 and the drum 132 causes the upper portions 142 and 144 of the belts 136 and 138 to move in opposite directions parallel to the rod 126. Clips 154 and 156 are securely attached to sleds 158 and 160 on which the brackets 122 and 124 are mounted. The sleds 158 and 160 move along the rod 126, and the clips 154 and 156 may be attached to or detached from the belts 136 and 138, respectively, such that movement of belts 136 and 138 is transferred to the brackets 122 and 124.

With the sleds 158 and 160 symmetrically arranged about the center line 70 and the clips 154 and 156 attached to the belt upper portions 142 and 144, movement of the handle 130 will cause the brackets to move in synchronization but in opposite directions along the rod 126. The bracketing system 120 thus may be arranged to bracket a certain range of the cubes 72 under the curve 76 to illustrate how many of such blocks are contained under the curve 76 within the desired range on both sides of the center line 70.

On the other hand, with the clips 154 and 156 disconnected from the cable portions 142 and 144, the brackets 122 and 124 may be slid by hand along the rod 126 in an asymmetrical manner to bracket any portion of the area under the curve 76, either to the left of the center line 70, or to its right, or covering both of its sides.

The system 20 is used in the following manner. Initially, data representing a given statistical population is compiled. As the system 20 is primarily used for instructional purposes, the compiled data should contain 100 data elements. Each of these data elements is associated with one of the cubes 72. To correlate the cubes 72 with the data element, some value representing each data element is imprinted on the cubes 72 using the indicia 74.

The ruler 94 is then imprinted on its lower portion 94 with the lowest and highest values of the data elements in the population to be analyzed. The range between these highest and lowest elements is divided into 20 equal increments, including the highest and lowest elements, and the ruler lower portion 94 is marked with these characters associated with each of these increments.

In the illustrated example, the population may be a group of 100 people and the data elements may represent the weight of each of these people. In this case, the lowest weight is 141 pounds, the highest weight is 159 pounds, and the increments between these lowest and highest values are twenty 1-pound increments between 141 pounds and 159 pounds, inclusive. This range is centered at 151 pounds. With several basic assumptions made, the principles of statistics state that, when plotted, the data elements described above will result in a bell-shaped normal distribution curve such as the curve 76 shown in FIG. 1. And since the system 20 is designed to illustrate an academic example, the cubes 72 form a curve that approximates the normal distribution curve when inserted into the appropriate rows 30–68.

Now, in order to estimate how many data elements of the population lies within a range of standard deviations, the blocks within the range of standard deviation are counted. For example, determine the probability that a given data element will be within one standard deviation, the brackets 122 and 124 are moved until they include the numbers 1.00, and −1.00 on the upper portion 92 of the ruler 90. All of the blocks within the brackets 122 and 124 are counted. As 68 blocks fall between the brackets 122 and 124 when they are arranged outside of one standard deviation, one can estimate that there is a 68% chance that a data element will fall within one standard deviation.

If one wishes to estimate the likelihood that a given data element will have a value of between 154 and 155 pounds, the brackets 122 and 124 are moved (disconnected from the cables 136 and 138) such that they bracket the numbers 154 and 155. Counting the number of cubes 72 between the brackets indicates that nine blocks are between these brackets. Accordingly, one can estimate that there is approximately a 9% chance that any given data element will fall between 154 and 155 pounds.

Given the foregoing, it can be seen that other examples and exercises can be devised that illustrates statistics principles using the system 20. In particular, the system 20 can be used as is or modified slightly to allow one to illustrate such statistics concepts as sampling errors, confidence interval, confidence level, and hypothesis testing.

For example, to illustrate the concepts of sampling error, a new ruler 90 with a different set of numbers on its lower scale 94 would be inserted inside the rails 86 and 88. The upper portion 92 of the ruler 90 has the same numbers for the z scale, that is, from −3.00 z to +3.00 z. The lower portion 94, however, has values associated with 100 sample means which are randomly taken from a normal population whose data members were used with indicia 74 in a previous exercise that dealt with areas (probabilities) under the normal distribution curve. Values for sample means range from 145 to 155 with the mean of 150, and increments of 0.5. Students will insert 100 cubes from the side which is colored in red and has values ranging from 145 to 155 in the corresponding 20 slots. The 20 cubes which have the indicia 150 and which will be placed on the slots 48 and 50, are colored in blue to represent the sample's. correct estimation of population average. The 80 cubes which will be placed in slots 30–46 and 52–68 are colored red to portray those samples which made errors in estimating the means. Each set of cubes which are placed in the slots bear different shades of the color red. The slots 46 and 52 which are closer to the center line 70, bear a lighter shade of red than those which are on the extreme left and right (slots 30,68). The shade of red on the cubes becomes increasingly more intense as you move farther away from the center line 70 towards the extreme left and right. This is to show the students that in a sampling distribution, a clear majority of samples make errors in estimating population mean; and the farther the sample mean is from the population mean, the more critical the impact of the error becomes on estimating the mean.

The related concepts of confidence level and confidence interval can be easily presented by selecting a level of confidence in our estimate, say 95%, and finding its value on curve 76, the second group of numbers 78 (0.95). By moving the brackets 122 and 124 (turning the knob 130 in such a way that the right bracket is placed outside the slot that corresponds to 0.95 on the curve), the students can easily understand that 95 out of 100 cubes are found within the 2 brackets, and hints there is a 95% confidence that the population mean within a given interval from any of the 95 sample means.

To illustrate the concept of the confidence interval, the students read the values which are printed on the lower portion 94 of ruler 92 which corresponds with the left and right brackets. If those values are 146 pounds and 154 pounds, the students can easily learn that while it will not be possible to know the true population mean, if the sample mean is 150 pounds, the population mean will be anywhere between 146 and 154 pounds. The students will also note that the upper portion 92 of the ruler 90 corresponds with −2 standard deviations, and +2 standard deviations on the spots that brackets 124 and 122 covers the slots 34 and 64. They realize that since 2 standard deviations is equivalent to four pounds, the standard error of the mean should be two pounds.

If the students need to increase their confidence level in the estimate, to say 98%, they simply turn the knob 130 to move brackets 122 and 124 farther away from the center line 70 towards the tails of the curve so that they are placed outside slots 32 and 66, which corresponds to the area under the curve marked 0.98 by the second group of number 80. Since there are now 98 cubes within the two brackets, students easily understand that 98% of the sample means fall within the brackets and hints there is 98% confidence level in the estimate. Now by looking at the upper portion 92 of the ruler 90, the students realize that the new confidence interval covers an area from −2.5 z to +2.5 z. By looking at the values of the lower portion 94 of the ruler 90 and reading 145 for −2.5 z and 155 for +2.5 z, the students easily learn that if the population has a mean of 150 pounds, 98% of the time sample from that population would produce a sample mean which ranges from 145 to 155 pounds. Similarly, if a sample produces a mean of 150 pounds, the population mean will be anywhere between 145 and 155 pounds (confidence interval) and we will have 98% confidence on our estimate (confidence level).

To illustrate the example of presenting the concept of hypothesis testing, the same side of the red colored cubes can be used for the 100 slots. However, the upper portion of a new ruler will have indicia associated with the type I error $\alpha$. When the null hypothesis is that the population average equals a certain value, then the two brackets will be placed (by turning the knob 130) on the slots which represent the desired level of tolerable error. In this case the two brackets would represent the error boundaries.

The students can easily grasp the otherwise difficult concept of hypothesis testing by understanding that if they take one, and only one, sample from a population that has the hypothesized mean, and that sample mean has the value which falls between the two brackets, it may very well be that the sample has come from a population that has the hypothesized mean (it may also be that it comes from a population which has a mean close to the hypothesized mean, but not actually the hypothesized mean). In this case they naturally "fail to reject the null hypothesis". However, if the sample mean has the value which falls outside the two brackets, then the difference between the sample mean and the population hypothesized mean cannot be attributed to the sampling error, at least 95% of the time or 98% of the time ($\alpha$=5% or 2%, whichever the case). So the null hypothesis can be rejected. The learner easily understands the concept as he/she operates the device.

In situations where the alternative hypothesis is that the population mean is greater than the hypothesized mean, the brackets 122 and 124 may be provided with hinges 162 and 164 that allow upper portions of the brackets to be swung outwardly so that it is horizontal; the upper portion of the bracket 124 is swung outwardly in FIG. 1. The students detach the clip 156 from the sled 160 and move the bracket 124 to the extreme left of the rails 86 and 88. They rotate the upper part of bracket 124 on the hinge 162 to the left so that it becomes parallel to the rail 84. Then they detach the clip 154 from sled 158 and move bracket 122 to the right of the rails 86 and 88 until it reaches a point which corresponds to the area under the curve which corresponds to their desired level of significance.

The desired level of significance can be found on the ruler 90, or alternatively on the set of numbers 78 which are printed above the curve 76 (by substituting the level of confidence for the level of significance). In situations like this the students understand that there is no boundary to the left of the curve, but there is one to the right as is shown by bracket 122. A sample from a population which produces a mean that falls outside bracket 122 will indicate that the population mean is greater than the hypothesized mean because it is outside the boundary of errors. So the null hypothesis of the population mean being less than or equal to the hypothesized mean will be rejected. If a sample produces a mean which is anywhere between the left tail and the right bracket 122, it will fail to reject the null hypothesis because it may come from the population which has the same value as the hypothesized mean, somehow more, or much less, but the applied statistical procedures cannot definitely verify that.

Figure 2A:
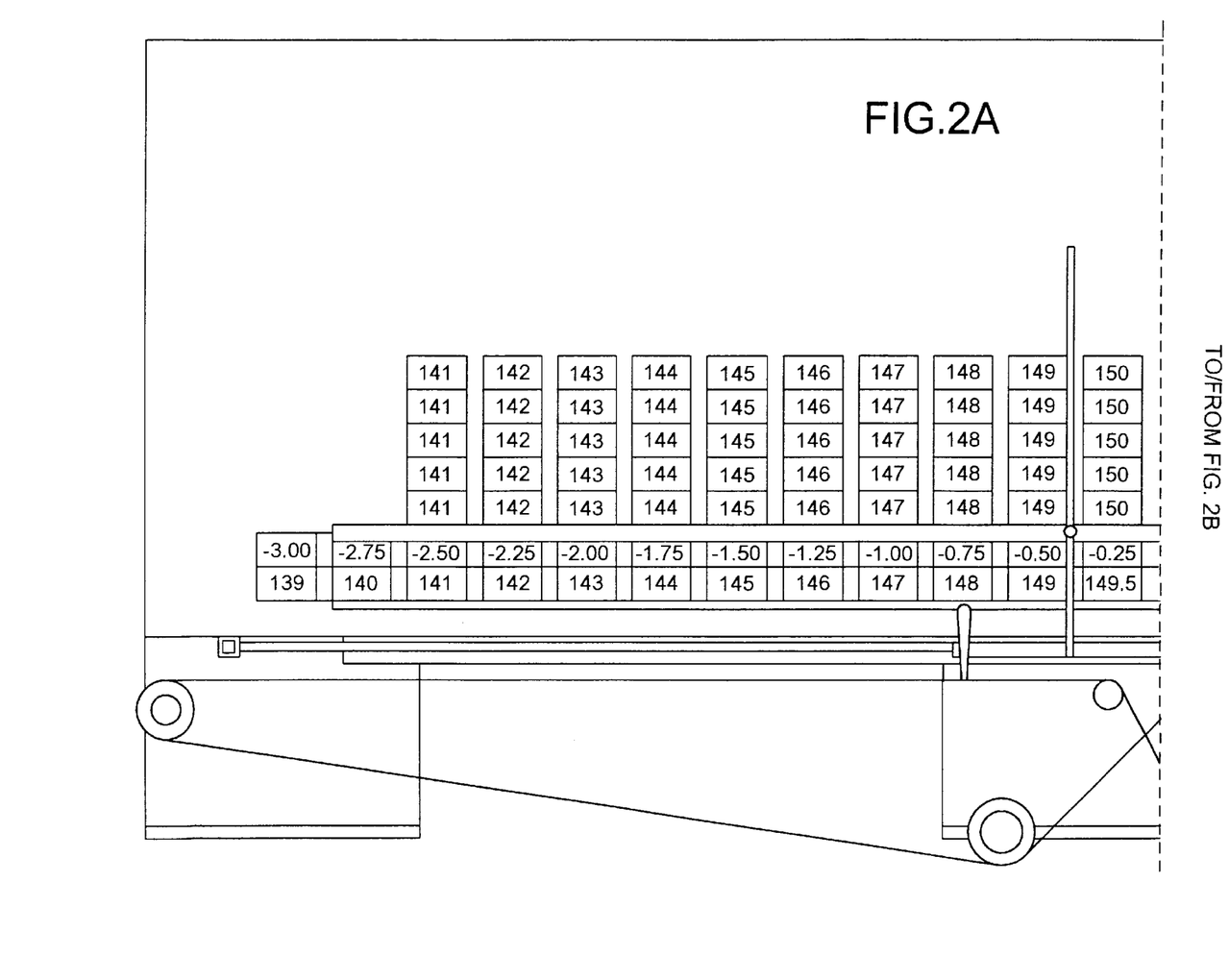
Figure 2B:
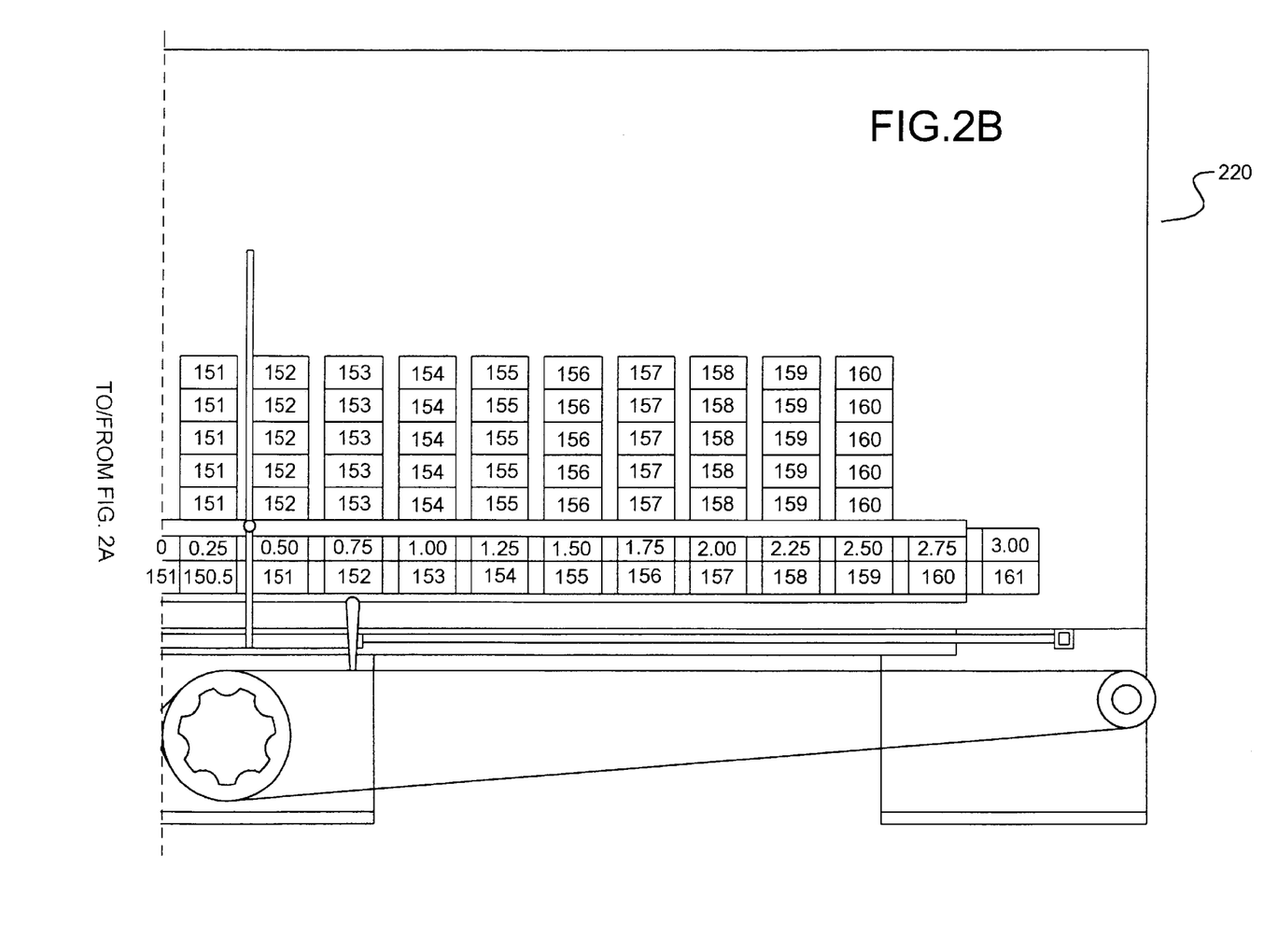

Referring now to FIG. 2, depicted therein is an alternative system 220 that may be constructed in a manner similar to the system 20 described above. This system 220 serves the same general purpose as the system 20 but uses a uniform distribution curve rather than a normal distribution curve. In this case, the cubes are arranged in twenty rows of five to illustrate a uniform distribution curve. Statistics principles relating to such a uniform distribution curve may be illustrated using the system 220 in a manner similar to that of the system 20. A ruler different than that shown in FIG. 2 would likely be used to illustrate the principles of the uniform distribution curve.

Although this system 20 has been described above in terms of a mechanical device including discrete, manipulable elements, it should be clear that the principles of the present invention may be embodied in other forms such as a computer program. In the context of a computer program, the slots 30–68 can be graphically represented and the physical cube 72 can be represented by graphic elements or tokens. All of the indicia contained in the system 20 may be manipulated by standard graphical editing techniques. This would allow, for example, the lower portion 94 of the ruler 90 to be modified simply by editing a number of variables in a list or directly on the graphical representation of a ruler. The tokens may be provided with indicia analogous to the indicia 74 that may be easily modified by standard editing techniques. And the brackets 122 and 124 may be controlled through the use of buttons that:

(a) simulate the action of the clips 154 and 156 by allowing a single pair of buttons to move both brackets 122 and 124 in opposite directions at the same rate;

(b) simulate the action of the hinges 162 and 164 by providing a toggle switch that rotates an upper portion of the brackets;

(c) allow these brackets 122 and 124 to be linked such that they move together in the same direction (something that cannot be achieved using the mechanical system 20);

(d) allow each brackets 122 or 124 to be independently operated by a separate set of buttons.

A software version of the system 20 would be highly customizable and could be packaged with numerous data sets that the student could work through to obtain an understanding of statistics principles. It also can be distributed cheaply and widely.

But while a software version of the system 20 may have the advantage of allowing variables to be changed easily, it does not provide the tactile feedback of this system 20. Thus, a mechanical implementation such as that embodied in the system 20 may in some cases be preferable, while a software version of the system 20 may in other cases be preferable. Or it may be that a combination of a mechanical device to illustrate basic principles and a software program to allow these principles to be applied to a broader class of statistical problems may be the best solution.

Accordingly, it should be clear that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. An instructional system for statistics comprising:
   a plurality of data members, where each data member is associated with a given percentage of data elements in a statistical population; and
   a frame defining a predetermined number of slots, where the number of slots is selected based on a predetermined number of standard deviations; wherein
      the slots are arranged about a centerline such that the lengths of the slots generally correspond to a distribution curve and each of the slots corresponds to a portion of the predetermined number of standard deviations;
      at least one data member is inserted into each of the slots; and
      the probability that a data element will occur in the statistical population can be estimated based on the number of data members in a given slot.

2. An instructional system as recited in claim 1, in which the slots are symmetrically arranged about the center line.

3. An instructional system as recited in claim 1, in which the predetermined number of standard deviations is five.

4. An instructional system as recited in claim 3, in which the predetermined number of slots is twenty.

5. An instructional system as recited in claim 4, in which each slot corresponds to twenty five percent of one standard deviation.

6. An instructional system as recited in claim 5, in which, if the slots are sequentially numbered one through twenty from left to right:
   the first, second, nineteenth, and twentieth slots are long enough to accept one data element each;
   the third and eighteenth slots are long enough to accept two data elements each;
   the fourth and seventeenth slots are long enough to accept three data elements each;
   the fifth and sixteenth slots are long enough to accept four data elements each;
   the sixth and fifteenth slots are long enough to accept five data elements each;
   the seventh and fourteenth slots are long enough to accept seven data elements each;
   the eighth and thirteenth slots are long enough to accept eight data elements each;
   the ninth and twelve slots are long enough to accept nine data elements each; and
   the tenth and eleventh slots are long enough to accept ten data elements each.

7. An instructional system as recited in claim 1, further comprising first and second bracket members movable relative to the slots to provide a visual indication of which slots are under analysis.

8. An instructional system as recited in claim 7, further comprising transmission means for moving the first and second bracket members simultaneously in opposite directions.

9. An instructional system as recited in claim 8, further comprising means for selectively coupling the first and second bracket members to and de-coupling the first and second bracket members from the transmission system.

10. An instructional system as recited in claim 1, further comprising ruler means detachably attached to the frame adjacent to the slots for associating the slots with indicia relevant to the slots.

11. An instructional method for students of statistics, comprising the steps of:

provding a plurality of data tokens, where each data token is associated with a given percentage of data elements in a statistical population; and providing a frame defining a predetermined number of slots;

arranging a predetermined number of slots about a centerline, where the number of slots is selected based on a predetermined number of standard deviations and each of the slots corresponds to a portion of the predetermined number of standard deviations;

associating at least one data token with each of the slots; and estimating the probability that a data element will occur in the statistical population based on the number of data tokens associated with a given slot.

12. An instructional method as recited in claim 11, in which the slots are symmetrically arranged about the center line.

13. An instructional method as recited in claim 11, in which the predetermined number of standard deviations is five.

14. An instructional method as recited in claim 13, in which the predetermined number of slots is twenty.

15. An instructional method as recited in claim 14, in which each slot corresponds to twenty five percent of one standard deviation.

16. An instructional method as recited in claim 15, that, if the slots are sequentially numbered one through twenty from left to right, further comprises the steps of associating:

one data token with each of the first, second, nineteenth, and twentieth slots;

two data tokens with each of the third and eighteenth slots;

three data tokens with each of the fourth and seventeenth slots;

four data tokens with each of the fifth and sixteenth slots;

five data tokens with each of the sixth and fifteenth slots;

seven data tokens with each of the seventh and fourteenth slots;

eight data tokens with each of the eighth and thirteenth slots;

nine data tokens with each of the ninth and twelve slots; and ten data tokens are associated with each of the tenth and eleventh slots.

17. An instructional method as recited in claim 11, further comprising the steps of providing first and second bracket members that are movable relative to the slots to provide a visual indication of which slots are under analysis.

18. An instructional method as recited in claim 17, further comprising the step of moving the first and second bracket members simultaneously in opposite directions.

19. An instructional system for statistics comprising:

a plurality of data members, where each data member is associated with a one percent of a number of data elements in a statistical population; and a frame defining first through twentieth slots, where the slots are symmetrically arranged about a center line, and each slot corresponds to one-quarter of a standard deviation so that the slots span five standard deviations; wherein the slots generally correspond to a normal distribution curve and each of the slots corresponds to a portion of the predetermined number of standard deviations;

one data member is inserted into each of the first, second, nineteenth, and twentieth slots;

two data members are inserted into each of the third and eighteenth slots;

three data members are inserted into each of the fourth and seventeenth slots;

four data members are inserted into each of the fifth and sixteenth slots;

five data members are inserted into each of the sixth and fifteenth slots;

seven data members are inserted into each of the seventh and fourteenth slots;

eight data members are inserted into each of the eighth and thirteenth slots;

nine data members are inserted into each of the ninth and twelve slots; and ten data tokens are associated with each of the tenth and eleventh slots; and the probability that a data element will occur in the statistical population can be estimated based on the number of data members in a given slot.

20. An instructional system as recited in claim 19, further comprising ruler means detachably attached to the frame adjacent to the slots for associating the slots with indicia relevant to the slots.

* * * * *